United States Patent
Shen

(10) Patent No.: US 8,832,956 B2
(45) Date of Patent: Sep. 16, 2014

(54) POSITION ADJUSTING DEVICE WITH DISTANCE DETECTING MECHANISM

(75) Inventor: Hung-Tsan Shen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 221 days.

(21) Appl. No.: 13/567,161

(22) Filed: Aug. 6, 2012

(65) Prior Publication Data

US 2013/0160315 A1 Jun. 27, 2013

(30) Foreign Application Priority Data

Dec. 21, 2011 (TW) .............................. 100147853 A

(51) Int. Cl.
*G01B 5/25* (2006.01)
(52) U.S. Cl.
USPC ............................................................ 33/613
(58) Field of Classification Search
USPC ............ 33/549, 568, 573, 613, 645, 832, 833
See application file for complete search history.

(56) References Cited

U.S. PATENT DOCUMENTS

| | | | | |
|---|---|---|---|---|
| 5,299,609 A * | 4/1994 | Wedler | ............................ | 33/613 |
| 5,797,193 A * | 8/1998 | Amend et al. | ................... | 33/645 |
| 6,189,227 B1 * | 2/2001 | Siegfried | ........................ | 33/613 |
| 6,421,928 B1 * | 7/2002 | Miller | .............................. | 33/613 |
| 7,155,840 B1 * | 1/2007 | Carbonaro | ...................... | 33/613 |
| 7,271,879 B2 * | 9/2007 | Lim et al. | ......................... | 33/568 |
| 8,656,603 B1 * | 2/2014 | Rush | ................................ | 33/613 |
| 2004/0263108 A1 * | 12/2004 | Lim et al. | ......................... | 33/568 |
| 2013/0212853 A1 * | 8/2013 | Werner et al. | .................... | 33/645 |

* cited by examiner

*Primary Examiner* — G. Bradley Bennett
(74) *Attorney, Agent, or Firm* — Novak Druce Connolly Bove + Quigg LLP

(57) ABSTRACT

A position adjusting device includes a support frame, two adjusting assemblies, and two distance detecting mechanisms. The support frame has a first assembly portion and a second assembly portion substantially parallel to the first assembly portion. The adjusting assemblies are slidably positioned on the second assembly portion. The distance detecting mechanisms are slidably positioned on the first assembly portion, and each of the two distance detecting mechanisms is connected to one adjusting assembly.

18 Claims, 4 Drawing Sheets

POSITION ADJUSTING DEVICE WITH DISTANCE DETECTING MECHANISM

BACKGROUND

1. Technical Field

The present disclosure generally relates to position adjusting devices, and particularly, to a position adjusting device using a laser distance detecting mechanism.

2. Description of the Related Art

In machining a workpiece with an electrical discharge method, the workpiece is positioned on a clamping tool, and then the clamping tool is positioned on a worktable of a discharge device. In order to enhance the machining precision of the discharge device, the workpiece is substantially perpendicular to the clamping tool. A detecting device is positioned on the discharge device to detect a position of the workpiece. If the detecting device detects a deviation of the workpiece from a predetermined position, an operator needs to adjust the position of the workpiece, this is done by hand and may need to be done many times, thereby wasting a lot of time.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
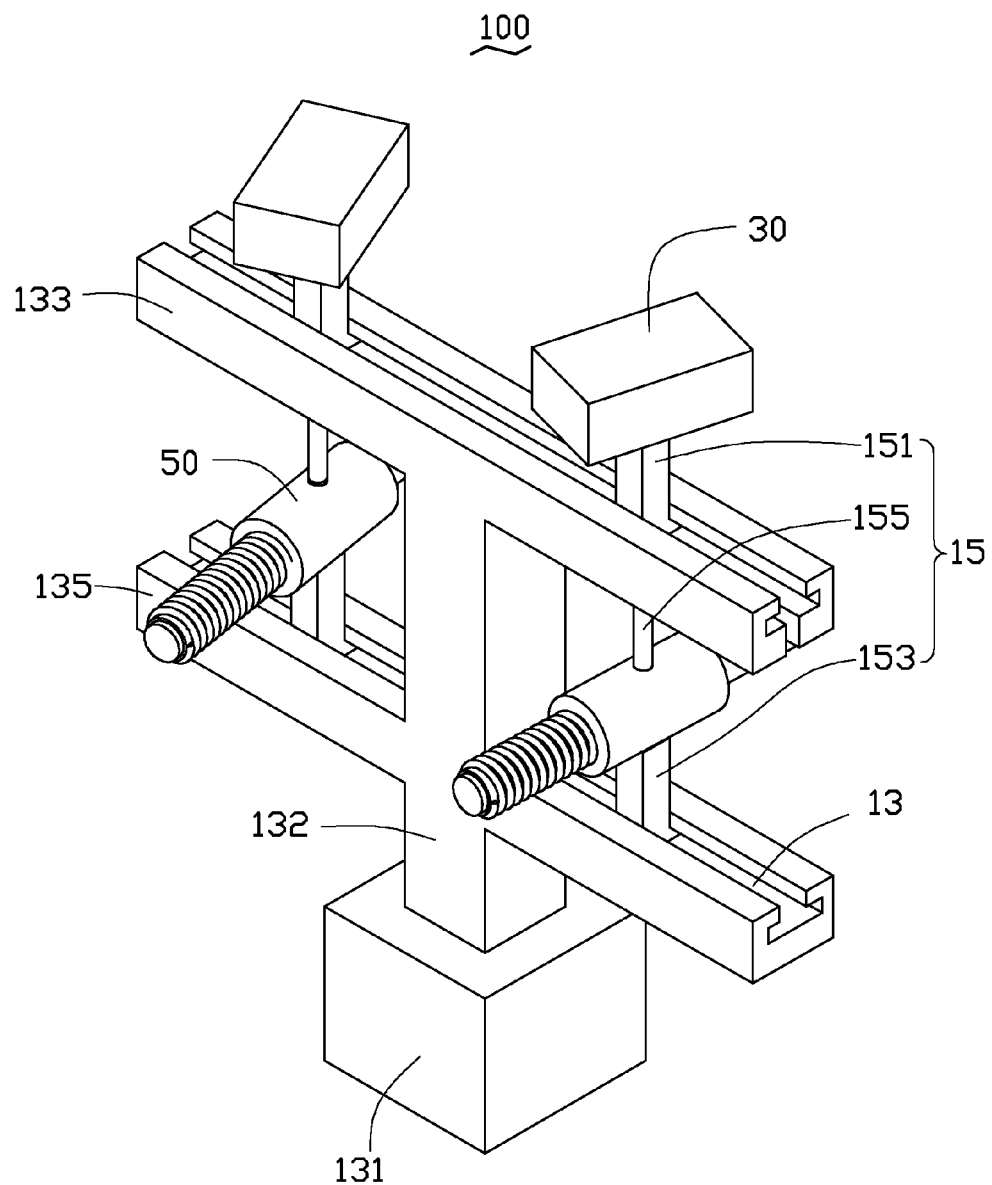
FIG. 1 is an isometric, assembled view of an embodiment of a position adjusting device.
Figure 4:
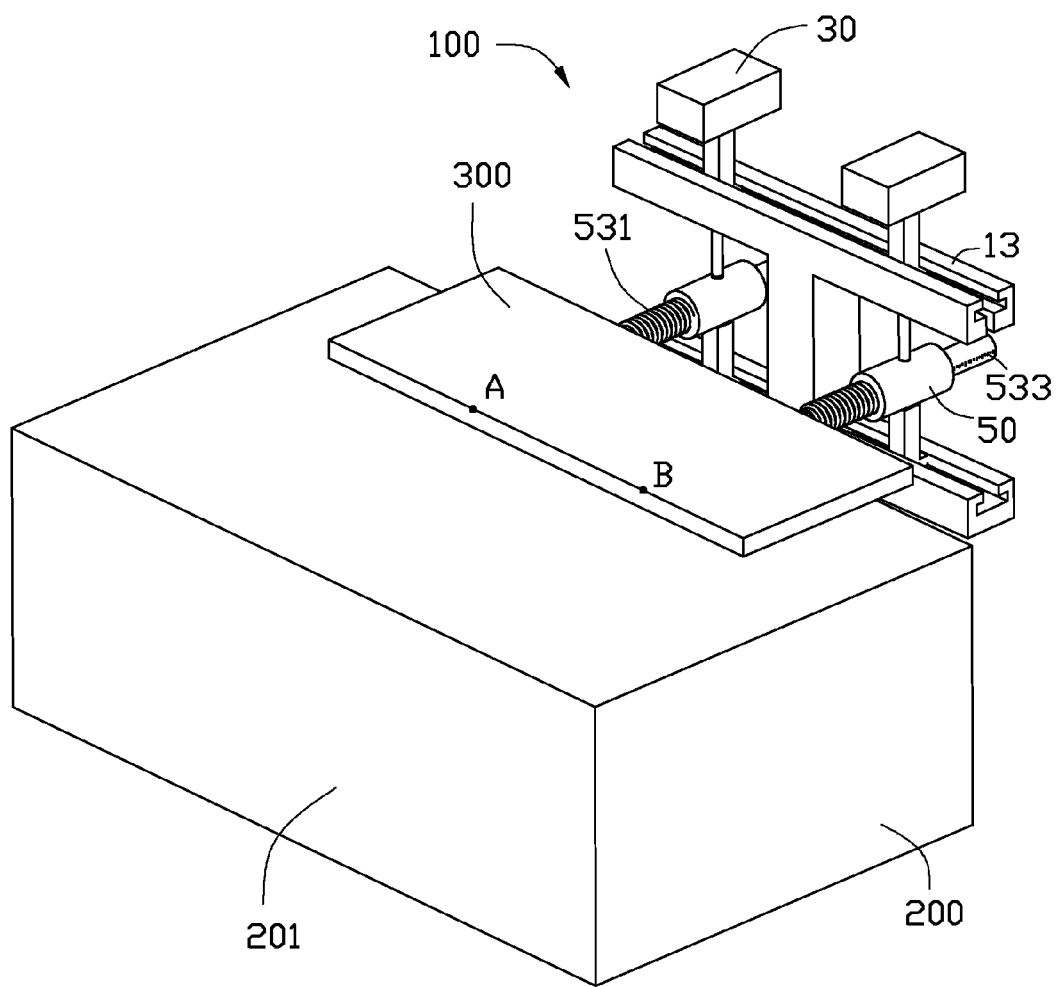
FIG. 4 is an isometric view of the position adjusting device of FIG. 1 adjusting a position of a workpiece on a worktable.

Referring to FIG. 1 and FIG. 4, an embodiment of a position adjusting device 100 is used for adjusting a position of a workpiece 300 positioned on a worktable 200. In an illustrated embodiment, the workpiece 300 is made of metal.

The position adjusting device 100 includes a support frame 13, two slide assemblies 15, two distance detecting mechanisms 30, and two adjusting assemblies 50. The distance detecting mechanisms 30 and the adjusting assemblies 50 are connected to the support frame 13 via the slide assemblies 15. In the illustrated embodiment, the distance detecting mechanisms 30 are laser distance detecting mechanisms.

Figure 2:
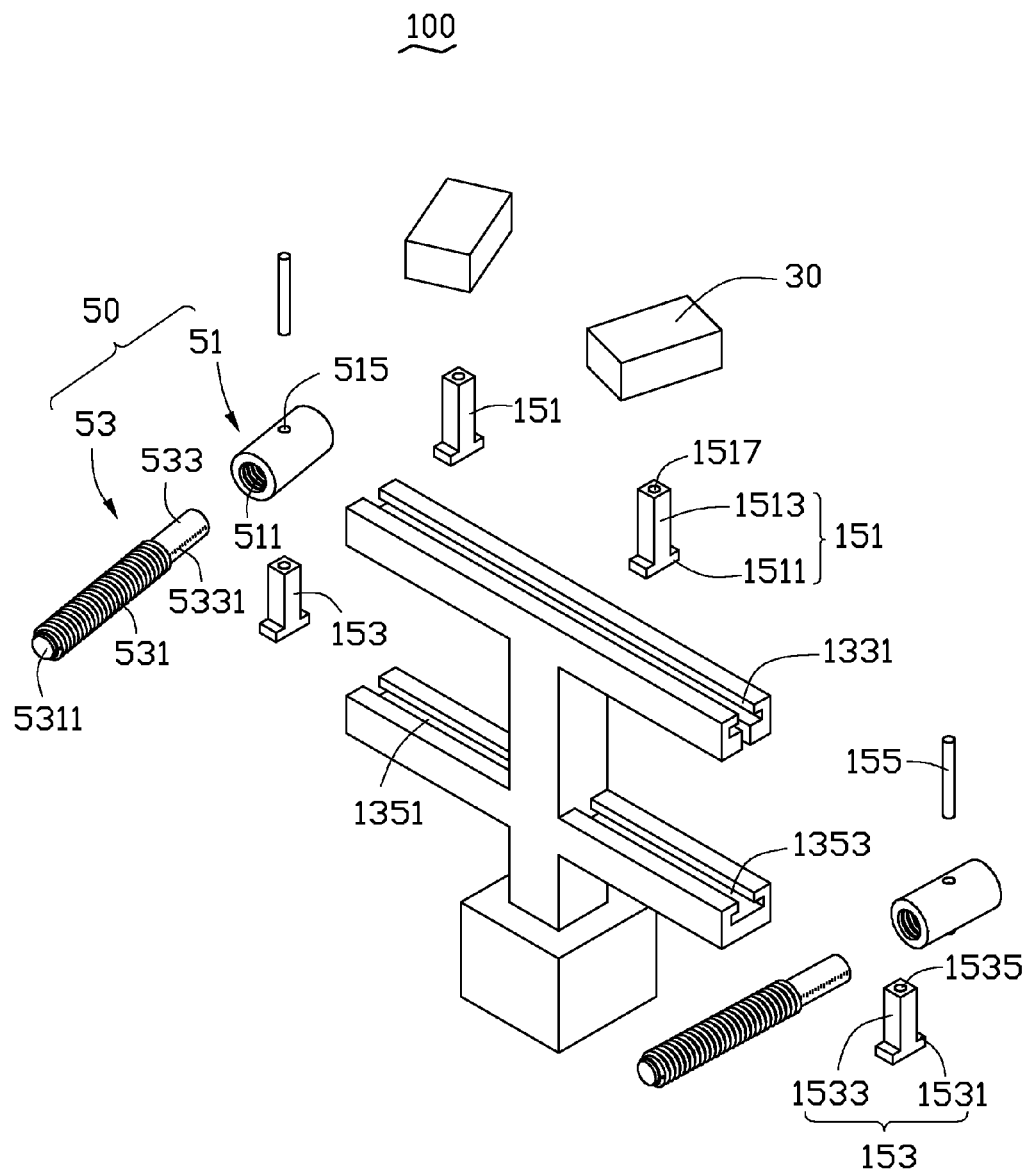
FIG. 2 is an isometric, exploded view of the position adjusting device of FIG. 1.
Figure 3:
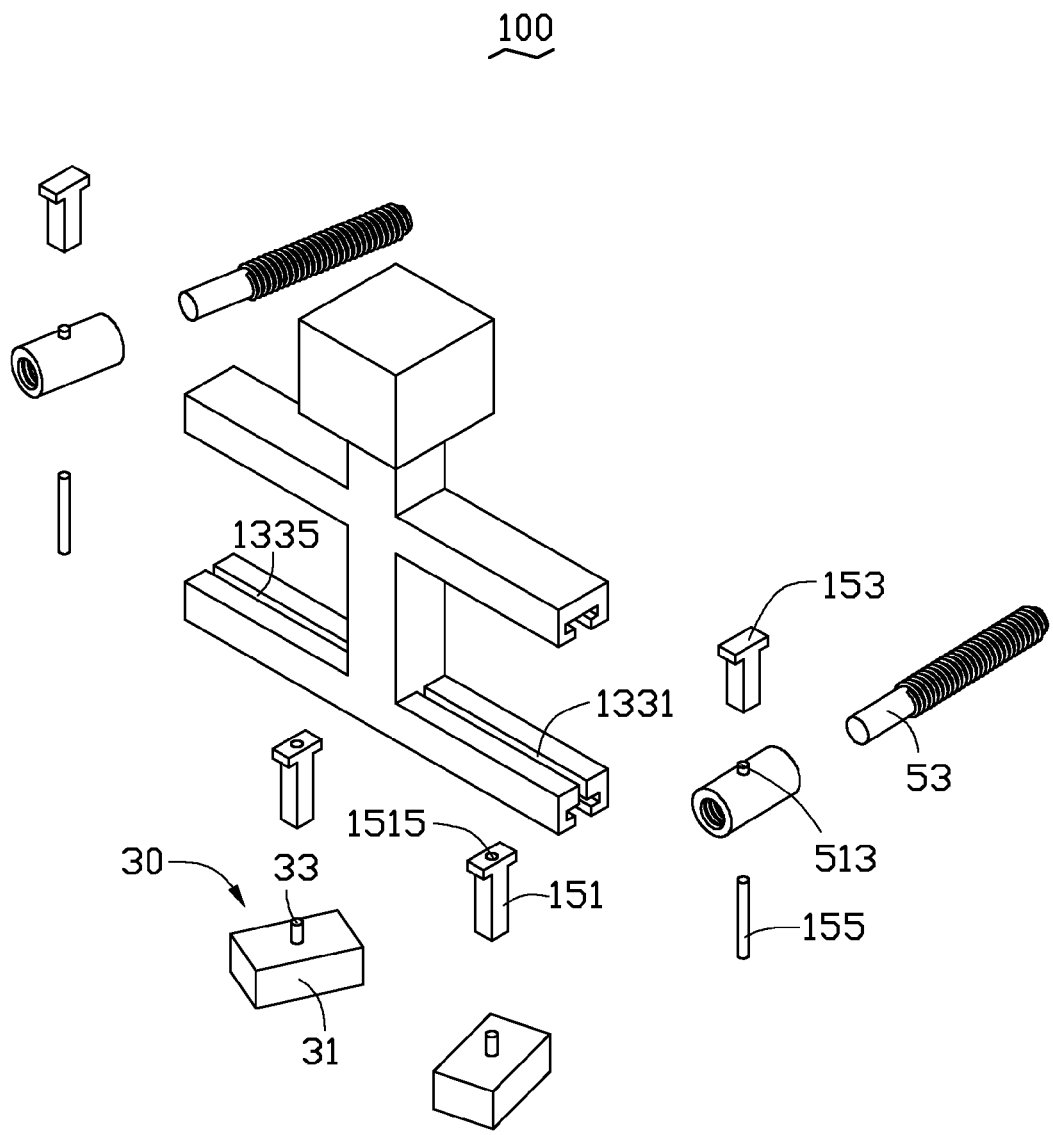
FIG. 3 is similar to FIG. 2, but viewed from another aspect.

Referring also to FIGS. 2 and 3, the support frame 13 is adjacent to the worktable 200. The support frame 13 includes a base portion 131, a support portion 132, a first assembly portion 133, and a second assembly portion 135. The base portion 131 is substantially rectangular, and strongly magnetic, thereby fixing itself to a side surface of the worktable 200. The support portion 132 extends substantially perpendicularly from the base portion 131. The first assembly portion 133 is formed on an end of the support portion 132 away from the base portion 131, and the first assembly portion 133 is substantially perpendicular to the support portion 132. The first assembly portion 133 axially defines an inverted T-shaped assembly groove 1331 for receiving the slide assemblies 15. A bottom surface of the inverted T-shaped assembly groove 1331 defines a first connecting groove 1333 and a second connecting groove 1335.

The second assembly portion 135 is formed on a middle part of the support portion 132, and the second assembly portion 135 is substantially perpendicular to the support portion 132. The second assembly portion 135 is substantially parallel to the first assembly portion 133. The second assembly portion 135 axially defines a first sliding groove 1351 and a second sliding groove 1353. Each of the first sliding groove 1351 and the second sliding groove 1353 is an inverted T-shape.

Each slide assembly 15 includes a first sliding member 151, a second sliding member 153, and a connecting member 155. The first sliding member 151 is positioned on the first assembly portion 133. The first sliding member 151 is substantially T-shaped, and includes a slide portion 1511 and a support portion 1513 formed on the slide portion 1511. The slide portion 1511 is slidably received in the assembly groove 1331 of the first assembly portion 133. The slide portion 1511 defines a connecting groove 1515 for receiving the connecting member 155, and the support portion 1513 defines a positioning groove 1517 in which the distance detecting mechanism 30 is located. The second sliding member 153 is substantially T-shaped, and includes a slide portion 1531 and a support portion 1533 formed on the slide portion 1531. The slide portion 1531 is slidably received in the first sliding groove 1351 or in the second sliding groove 1353. An end of the support portion 1533 away from the slide portion 1531 defines a connecting groove 1535 for connecting the adjusting assembly 50. The connecting member 155 is substantially cylindrical. An end of the connecting member 155 engages with the first sliding member 151, and the other end of the connecting member 155 connects with the adjusting assembly 50.

Each distance detecting mechanisms 30 includes a base portion 31 and an engaging portion 33 formed on the base portion 31. The base portion 31 is positioned on the first sliding member 151 with the engaging portion 33 received in the positioning groove 1517.

The adjusting assemblies 50 are positioned on the second sliding members 153 for adjusting a position of the workpiece 300. Each adjusting assembly 50 includes a main body 51 and an adjusting pole 53 threadedly engaging with the main body 51. The main body 51 axially defines a threaded hole 511 for receiving the adjusting pole 53, and forms a connecting protrusion 513 received in the connecting groove 1535 of the second sliding member 153. The main body 51 further defines an assembly hole 515 aligned with the connecting protrusion 513. The connecting member 155 is engaged in the assembly hole 515.

The adjusting pole 53 is substantially cylindrical, and includes a threaded portion 531 and an operating portion 533 extending from an end of the threaded portion 531. The threaded portion 531 is positioned in the threaded hole 511 of the main body 51, and forms a resisting end 5311 away from the operating portion 533. The resisting end 5311 is magnetic, and thus capable of absorbing the workpiece 300. A side wall of the operating portion 533 forms scales 5331.

Referring to FIGS. 1 through 4, in use, the position adjusting device 100 is fixed on the worktable 200 via the base portion 131. The workpiece 300 is positioned on the worktable 200, and allowed to make contact with the parallel adjusting assemblies 50. The distance detecting mechanisms 30 emit laser beams at a point A and a point B. The point A and the point B are located at an edge of the workpiece 300. The distance detecting mechanisms 30 calculate a first distance to the point A from one distance detecting mechanism 30, and a second distance to the point B from the other distance detecting mechanism 30. The adjusting poles 53 are rotated to adjust the position of the workpiece 300, until the first distance is equal to the second distance. Thereby, the workpiece 300 is adjusted to a predetermined and desired position.

The workpiece 300 is easily adjusted to the predetermined position by the position adjusting device 100, and the position adjusting device 100 has high adjusting precision via the adjusting assemblies 50. In addition, the workpiece 300 is always in contact with the resisting ends 5311 by virtue of magnetic attraction, and thus there is no need to add extra positioning structures on the worktable 200 to position the workpiece 300.

In an alternative embodiment, the slide assemblies 15 can be omitted in the position adjusting device 100. In that case, the distance detecting mechanisms 30 is directly and slidably positioned on the first assembly portion 133, and the adjusting assemblies 50 are directly and slidably positioned on the second assembly portion 135. The distance detecting mechanisms 30 here are connected to the adjusting assemblies 50.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A position adjusting device for adjusting a position of a workpiece, comprising:
   a support frame;
   two adjusting assemblies slidably positioned on the support frame and connected to the workpiece; and
   two distance detecting mechanisms slidably positioned on the support frame and connected to the two adjusting assemblies, respectively;
   wherein the two distance detecting mechanisms detect a distance between an edge of the workpiece and the distance detecting mechanisms, thereby deciding an adjusting length of the adjusting assemblies.

2. The position adjusting device of claim 1, wherein the support frame comprises a first assembly portion and a second assembly portion substantially parallel to the first assembly portion; the position adjusting device further comprises two slide assemblies positioned on the support frame, each slide assembly comprises a first sliding member and a second sliding member; the distance detecting mechanisms are slidably positioned the first assembly portion via the first sliding members, and the adjusting assemblies are slidably positioned on the second assembly portion via the second sliding members.

3. The position adjusting device of claim 2, wherein the first assembly portion defines a first assembly groove; the first sliding member comprises a slide portion and a support portion formed on the slide portion, the slide portion is received in the first assembly groove, and the support portion is connected to the distance detecting mechanism.

4. The position adjusting device of claim 3, wherein the support portion defines a positioning groove, and the distance detecting mechanism forms an engaging portion received in the positioning groove.

5. The position adjusting device of claim 2, wherein the second assembly portion axially defines a first sliding groove and a second sliding groove; each second sliding member comprises a slide portion and a support portion formed on the slide portion; the slide portion of one second sliding member is received in the first sliding groove, and the slide portion of the other second sliding member is received in the second sliding groove; the support portions of the second sliding members are connected to the adjusting assemblies.

6. The position adjusting device of claim 5, wherein the support portion of each second sliding member defines a connecting groove; and each adjusting assembly comprises a main body having a connecting protrusion received in the connecting groove of the second sliding member.

7. The position adjusting device of claim 6, wherein each of the slide assemblies further comprises a connecting member connecting the adjusting assembly to the first sliding member.

8. The position adjusting device of claim 7, wherein the main body axially defines a threaded hole; and the adjusting assembly further comprises an adjusting pole extending through the threaded hole.

9. The position adjusting device of claim 8, wherein the adjusting pole forms a resisting end, and the resisting end is magnetic for absorbing the workpiece.

10. A position adjusting device, comprising:
    a support frame having a first assembly portion and a second assembly portion substantially parallel to the first assembly portion;
    two adjusting assemblies slidably positioned on the second assembly portion; and
    two distance detecting mechanisms slidably positioned on the first assembly portion, and each of the two distance detecting mechanisms connected to one adjusting assembly.

11. The position adjusting device of claim 10 further comprising two slide assemblies positioned on the support frame, wherein each slide assembly comprises a first sliding member and a second sliding member; the distance detecting mechanisms are slidably positioned the first assembly portion via the first sliding members, and the adjusting assemblies are slidably positioned on the second assembly portion via the second sliding members.

12. The position adjusting device of claim 11, wherein the first assembly portion defines a first assembly groove; the first sliding member comprises a slide portion and a support portion formed on the slide portion, the slide portion is received in the first assembly groove, and the support portion is connected to the distance detecting mechanism.

13. The position adjusting device of claim 12, wherein the support portion defines a positioning groove, and the distance detecting mechanism forms an engaging portion received in the positioning groove.

14. The position adjusting device of claim 11, wherein the second assembly portion axially defines a first sliding groove and a second sliding groove; each second sliding member comprises a slide portion and a support portion formed on the slide portion; the slide portion of one second sliding member is received in the first sliding groove, and the slide portion of the other second sliding member is received in the second sliding groove; the support portions of the second sliding members are connected to the adjusting assemblies.

15. The position adjusting device of claim 14, wherein the support portion of each second sliding member defines a connecting groove; and each adjusting assembly comprises a main body having a connecting protrusion received in the connecting groove of the second sliding member.

16. The position adjusting device of claim 15, wherein each of the slide assemblies further comprises a connecting member connecting the adjusting assembly to the first sliding member.

17. The position adjusting device of claim 16, wherein the main body axially defines a threaded hole; and the adjusting assembly further comprises an adjusting pole extending through the threaded hole.

18. The position adjusting device of claim 17, wherein the adjusting pole forms a resisting end, and the resisting end is magnetic.

* * * * *